US011188914B2

(12) United States Patent
Sethi

(10) Patent No.: US 11,188,914 B2
(45) Date of Patent: Nov. 30, 2021

(54) METHOD FOR AUTHENTICATED BIOMETRIC TRANSACTIONS

(71) Applicant: TDK CORPORATION, Tokyo (JP)

(72) Inventor: Rakesh Sethi, Saratoga, CA (US)

(73) Assignee: TDK CORPORATION, Tokyo (JP)

( * ) Notice: Subject to any disclaimer, the term of this patent is extended or adjusted under 35 U.S.C. 154(b) by 81 days.

(21) Appl. No.: 16/196,921

(22) Filed: Nov. 20, 2018

(65) Prior Publication Data

US 2020/0160346 A1 May 21, 2020

(51) Int. Cl.
| | |
|---|---|
| G06K 9/00 | (2006.01) |
| G06Q 20/22 | (2012.01) |
| G06Q 20/40 | (2012.01) |
| H04W 12/04 | (2021.01) |
| H04W 4/70 | (2018.01) |
| H04W 12/0471 | (2021.01) |

(52) U.S. Cl.
CPC ... G06Q 20/40145 (2013.01); G06K 9/00087 (2013.01); G06Q 20/223 (2013.01); H04W 4/70 (2018.02); H04W 12/0471 (2021.01)

(58) Field of Classification Search
CPC .............................................. G06Q 20/40145
See application file for complete search history.

(56) References Cited

U.S. PATENT DOCUMENTS

| | | | |
|---|---|---|---|
| 7,631,193 B1 | 12/2009 | Hoffman | |
| 10,089,456 B2 | 10/2018 | Andrus et al. | |
| 2011/0047377 A1* | 2/2011 | Allen | H04L 9/0866 |
| | | | 713/168 |
| 2011/0235799 A1* | 9/2011 | Sovio | H04L 9/3073 |
| | | | 380/30 |
| 2014/0093144 A1 | 4/2014 | Feekes | |
| 2014/0155098 A1* | 6/2014 | Markham | H04B 1/0064 |
| | | | 455/456.3 |
| 2014/0337957 A1 | 11/2014 | Feekes | |
| 2016/0063233 A1 | 3/2016 | Bae et al. | |
| 2016/0248742 A1 | 8/2016 | Baghdasaryan | |
| 2017/0324554 A1* | 11/2017 | Tomlinson | H04L 9/0618 |

(Continued)

OTHER PUBLICATIONS

Masdari, et al., in "Comprehensive analysis of the authentication methods in wireless body area networks," from Security and Communication Networks (Year: 2016).*

(Continued)

*Primary Examiner* — Olabode Akintola
*Assistant Examiner* — Brandon M Duck
(74) *Attorney, Agent, or Firm* — Duane Morris LLP

(57) ABSTRACT

This application relates generally to secure machine to machine transactions and, more particularly, relates to systems and methods to for secure transactions based on biometric reading data over a magnetic interface. In an embodiment, a method performed by a user device includes: generating a session key in response to initiating a transaction; collecting biometric reading data associated with the transaction; converting the biometric reading data into a biometric code; generating a user payload based on the biometric code and the session key; transmitting the user payload via a magnetic transmitter; and transmitting the session key via a network connection separate from the magnetic transmitter.

18 Claims, 13 Drawing Sheets

(56) References Cited

U.S. PATENT DOCUMENTS

2017/0352213 A1* 12/2017 Bowie ................ G07C 9/00309
2018/0017635 A1* 1/2018 Guo ................... G01R 33/0029

OTHER PUBLICATIONS

Extended European Search Report in EP Application No. 19204206.7, dated Feb. 28, 2020, in 11 pages.
Georgia Institute of Technology, "Researchers Help Close Security Hole In Popular Encryption Software," Public Release: Aug. 9, 2018, 3 pages.

* cited by examiner

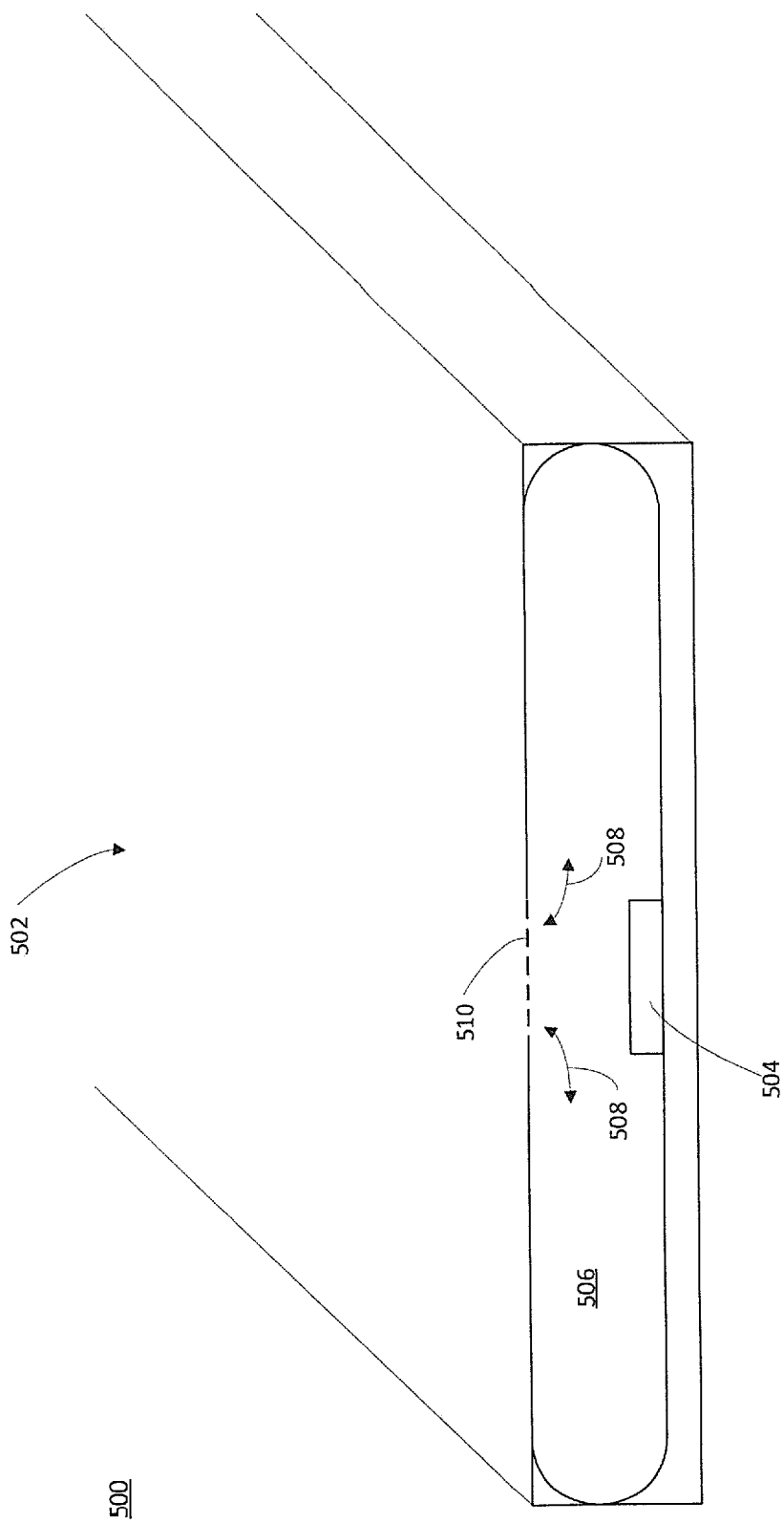

METHOD FOR AUTHENTICATED BIOMETRIC TRANSACTIONS

TECHNICAL FIELD

This application relates generally to secure machine to machine transactions and, more particularly, relates to systems and methods to for secure transactions based on biometric reading data over a magnetic interface.

BACKGROUND

A man-in-the-middle (MITM) attack may refer to a computer security failure where an unauthorized third party relays and/or alters a communication between two parties who believe that they are directly communicating with each other. Typically, a MITM attack may succeed only when the unauthorized third party can impersonate each endpoint as expected from the legitimate ends.

Security protocols may be put in place to thwart MITM attacks. However, the unauthorized third party may also take countermeasures against such security protocols. For example, typical security protocols may include the provision of a password or other form of authentication in order to initiate and/or complete the transaction. However, such forms of authentication may themselves be subject to a spoofing attack or other type of security failure when the unauthorized third party exploits a loophole that allows the unauthorized third party to access the requisite form of authentication. Therefore, there may be a need for improved security protocols that are more immune to MITM attacks than traditional security protocols.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In certain embodiments, a method performed by a user device includes: generating a session key in response to initiating a transaction; collecting biometric reading data associated with the transaction; converting the biometric reading data into a biometric code; generating a user payload based on the biometric code and the session key; transmitting the user payload via a magnetic transmitter; and transmitting the session key via a network connection separate from the magnetic transmitter.

In certain embodiments, the method further includes: comparing the biometric reading data with stored biometric reading data; and converting the biometric reading data into the biometric code in response to the biometric reading data not deviating beyond a failure threshold from the stored biometric reading data.

In certain embodiments, the failure threshold is a percentage of differences between adjacent normal RR intervals that are greater than 50 milliseconds.

In certain embodiments, the method further includes ending the transaction in response to the biometric reading data deviating beyond the failure threshold from the stored biometric reading data.

In certain embodiments, the method further includes generating the user payload based on the biometric code, the session key, and confidential information.

In certain embodiments, the confidential information is credit card information.

In certain embodiments, the magnetic transmitter comprises sixteen flux components, and the user payload comprises sixteen separate parts with each part transmitted using a different flux component.

In certain embodiments, the biometric reading data is produced from at least one of: a heartrate scanner, a fingerprint scanner, an iris scanner, and a facial recognition scanner.

In certain embodiments, the heartrate scanner is at least one of a pulse oximeter or a sensor for an electrocardiogram or a magnetocardiography reading.

In certain embodiments, the biometric reading data comprises either an RR interval or a PP interval.

In certain embodiments, the biometric reading data is collected using an ancillary device interfaced with the user device.

In certain, a method performed by a receiver device includes: receiving a user payload from a user device via a magnetic receiver; receiving a session key via a network separate from the magnetic receiver; accessing a stored biometric code produced from biometric reading data; producing a result from processing the user payload based on the stored biometric code and the session key; and completing a transaction based on the result meeting a criteria.

In certain embodiments, the result is a matching payload, and the criteria is whether the matching payload matches the user payload.

In certain embodiments, the result is a decoded user payload, and the criteria is whether the decoded user payload is an acceptable input for the transaction.

In certain embodiments, the decoded user payload is the acceptable input for the transaction when the decoded user payload is credit card transaction information that may be used for the transaction.

In certain embodiments, the network is an Internet.

In certain embodiments, the stored biometric code is accessed from a remote server over the network or is accessed from a local datastore of the receiver device.

In certain embodiments, the user payload and the session key is discarded when the result does not meet the criteria.

In certain embodiments, a method includes: generating, at a transmitter, a session key in response to initiating a transaction; collecting biometric reading data associated with a user; converting the biometric reading data into a biometric code; generating a user payload based on the biometric code and the session key; sending, from the transmitter to a receiver, the user payload via a magnetic transmitter; and sending, from the transmitter to the receiver, the session key via a network connection separate from the magnetic transmitter; accessing, at the receiver, a stored biometric code produced from stored biometric reading data associated with the user; producing a result from processing the user payload based on the stored biometric code and the session key; and completing the transaction based on the result meeting a criteria.

In certain embodiments, the method further includes discarding the user payload and the session key in response to completing the transaction.

In certain embodiments, the magnetic transmitter is a magnetoresistance array.

In certain embodiments, the magnetic transmitter comprises a tank circuit, wherein the tank circuit comprises an inductor and a capacitor.

In certain embodiments, the biometric reading data is collected using a laser emitting diode.

In certain embodiments, the laser emitting diode is coupled with a processor of the transmitter via a filter circuit.

In certain embodiments, the laser emitting diode is coupled with an inductor at a first node, and the processor is coupled with the inductor and a capacitor at a second node.

In certain embodiments, the magnetic transmitter is disposed within the transmitter, wherein the magnetic transmitter concentrates magnetic flux induced by the magnetic transmitter at an interface along the transmitter.

In certain embodiments, the magnetic transmitter is disposed within three discrete concentric walls that substantially surrounds the magnetic transmitter.

In certain embodiments, the three discrete concentric walls comprises two walls of a same material, such as aluminum.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

FIG. 5A is a perspective view block diagram of a user device configured to collect biometric reading data with a magnetoresistance (xMR) array, in accordance with various embodiments.

DETAILED DESCRIPTION OF EXEMPLARY EMBODIMENTS

Figure 1:
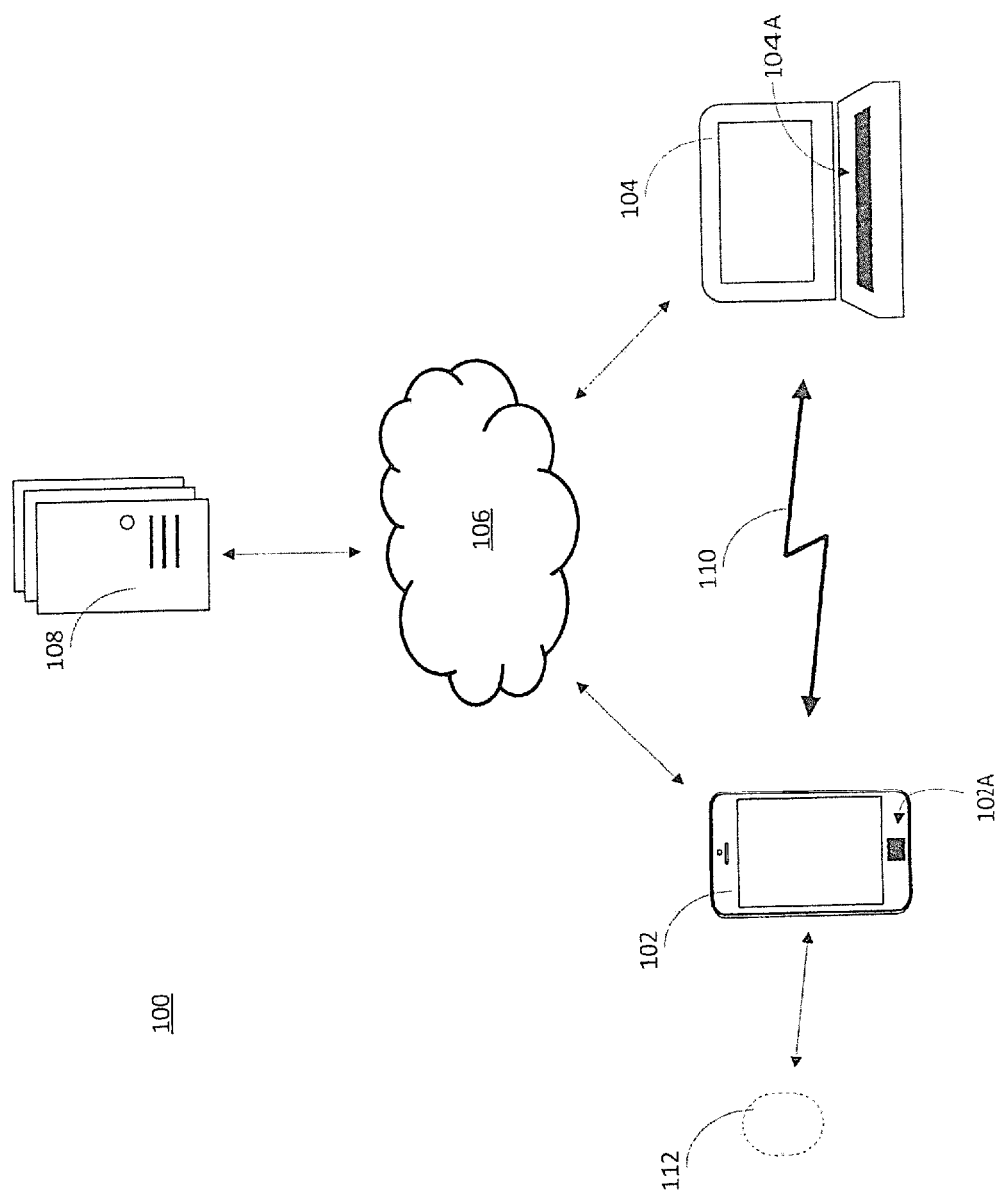
FIG. 1 is a diagram of a system configured to implement magnetic interface biometric authentication, in accordance with various embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

As noted above, a man-in-the-middle (MITM) attack may refer to a computer security failure where an unauthorized third party relays and/or alters a communication between two parties who believe that they are directly communicating with each other. For example, the parties may include a user and a financial institution, such as a bank. The user may provide confidential information, such as a credit card number or other financial information, to the bank to complete a sensitive transaction, such as a purchase transaction. This financial information may be transmitted from the user to the bank via a network, such as the Internet. However, a MITM attack may occur when the unauthorized third party intercepts the financial information during transit from the user to the bank. For example, this interception may occur electronically by intercepting the financial information as it is in transit over the network (e.g., the Internet) or when the financial information is collected locally, such as at a magnetic card reader. Once intercepted, the unauthorized third party may improperly utilize the user's financial information, such as to complete unauthorized purchase transactions.

A new approach is proposed that contemplates systems and methods for secure transactions via magnetic interface biometric authentication that avoids MITM attacks and spoofing. Specifically, magnetic interface biometric authentication may utilize a magnetic interface between machines that transfers signals via magnetic flux, thus requiring a sufficiently small distance for touch transactions that would not be susceptible to remote MITM attacks or other such interceptions. This magnetic flux may be transferred via a magnetoresistance (xMR) array, at both a user device and at a receiver device, to generate variable magnetic flux via various flux components or flux generating coils (e.g., as a tank circuit). This xMR array may utilize a housing with triplicate shielding to shield the xMR array to reduce noise and increase reception and/or transmission of a desired signal (e.g., as magnetic flux). Also, in certain embodiments, the xMR array may also be utilized directly as a biometric reader configured to produce biometric reading data.

Magnetic interface biometric authentication may also incorporate biometric reading data directly into transferred data, providing a degree of security superior to traditional biometric authentication that occurs only at a point of access, such as a user device. For example, traditional biometric authentication may occur directly at the user device, such as where a fingerprint scanner at the user device is used to authenticate the user for use of the user device and/or for authorization of a particular transaction using the user device. Such traditional biometric authentication merely performs an initial authentication and then fails to provide downstream authentication after the initial biometric authentication. Accordingly, MITM attacks may occur by intercepting signals produced after the initial biometric authentication. In contrast, magnetic interference biometric authentication may continue to provide downstream security by encoding or scrambling downstream signals with a biometric code specific to a user's biometric reading data. These downstream signals may not be able to be decoded or unscrambled without the user specific biometric code, thus providing an additional degree of security over traditional biometric authentication.

Furthermore, various embodiments include a layered security protocol where authentication is performed both at the user device and at the receiver device. For example, the user device may authenticate a user for use of the user device for a transaction. This authentication may be based on biometric reading data that characterizes the user. This authentication may also be carried out by the user device. Then, the user device may transmit a message to the receiver device so that the receiver device may also authenticate the user based on the same biometric reading data used by the user device.

In various embodiments, information and processing performed in any particular transaction is unique for each transaction and is not stored. For example, each transaction may be associated with a session key unique to each particular transaction. This session key may be utilized to for encoding with the biometric information for an additional degree of security. Accordingly, different transactions may be accorded different session keys such that a session key for one transaction will not work for decoding or authentication in another transaction. In certain embodiments, this session key may be transmitted over a network, such as the Internet, between the user device and the receiver device while other-information in a transaction, such as a user payload (e.g., a transmitter authentication payload or an encoded payload), may be transmitted over the local magnetic interface. Accordingly, magnetic interface biometric authentication may be more robust against MITM attacks as communications are broken up such that a single MITM attack will be unable to succeed due to the diversified communication channels used.

Various types of biometric reading data may be converted into a biometric code utilized for magnetic interface biometric authentication. For example, the biometric reading data may be produced from any type of scanner or detector of biometric reading data, such as a heartrate scanner (e.g., a pulse oximeter or a sensor for an electrocardiogram), a fingerprint scanner, a voice pattern scanner, an iris scanner, a facial recognition scanner, and the like. Each type of biometric reading data may be data that may be used to uniquely characterize an individual. For example, the biometric reading data may be of any type of unique biometric pattern, such as a fingerprint, a face, an iris pattern, a heartrate, a voice pattern, and the like. In certain embodiments, the biometric reading data may be a QRS complex that represents polarization of a heart's right and left ventricles. This QRS complex may be utilized to uniquely characterize a user based on various variations of the QRS complex, such as intervals of a R wave (e.g., an RR interval), or intervals of a PP wave (e.g., a PP interval). In a variety of embodiments, the actual collection of the biometric reading data may be performed, at least in part, by an ancillary device that is interfaced with the user device. This ancillary device may be, for example, a wearable, ingestible, or implantable device capable of collecting biometric reading data and relaying such biometric reading data to the user device for further processing. However, in particular embodiments, the actual collection of the biometric reading data may occur at the user device itself. This biometric reading data may be converted to a biometric code in a predetermined manner so that the biometric reading data, as expressed in the biometric code, may be utilized in signal processing in the course of magnetic interface biometric authentication.

FIG. 1 is a diagram of a system 100 configured to implement magnetic interface biometric authentication, in accordance with various embodiments. The system 100 may include a user device 102, a receiver device 104, a network 106, and at least one remote server 108. Each of the user device 102, receiver device 104, and at least one remote server 108 may be configured to communicate over the network 106, such as the Internet. Additionally, the user device 102 and the receiver device 104 may be configured to communicate over a magnetic interface 110. This magnetic interface may be implemented as a communication of magnetic flux, or magnetic forces, between the respective xMR arrays 102A, 104A.

As will be discussed further below, in certain embodiments, the respective xMR arrays may either generate and/or resonate with the magnetic flux generated by the other in order to communicate over the xMR arrays 102A, 104A. Also, in various embodiments, the xMR arrays may be disposed for communication by being substantially adjacent to each other. For example, the xMR arrays may have their respective user device housing or receiver device housing touching each other (e.g., by having the user device 102 rest on the receiver device 104) so that they are at a sufficiently small distance for touch transactions that would not be susceptible to remote MITM attacks or other such interceptions. Also, the xMR arrays 102A, 104A may generate variable magnetic flux via various flux components or flux generating coils (e.g., as a tank circuit). Furthermore, the xMR array may utilize a housing with triplicate shielding to shield the xMR array to reduce noise and increase reception and/or transmission of a desired signal (e.g., as magnetic flux).

In certain embodiments, the xMR array may also be utilized directly as a biometric reader configured to produce biometric reading data. For example, the xMR array may be utilized to produce biometric reading data as part of an electrocardiogram or a MCG reading from a user that puts exposed skin (e.g., as a finger) on a portal (e.g., an xMR portal) for the xMR array (e.g., where the xMR array functions as a sensor for an electrocardiogram or a MCG reading). More specifically, the user device may process the biometric reading data and use the same xMR array of the user device that collected the biometric reading data to transmit information over the local magnetic interface 110 between the xMR array of the user device and the xMR array of the receiver device. In other embodiments, the collection of biometric reading data and the transmission of information over a magnetic interface may be performed by different xMR arrays on the user device. For example, there may be multiple xMR arrays on the user device, with one for the collection of biometric reading data and the other for information transmission (e.g., transmission of the transmitter authentication payload or the encoded payload).

In various embodiments, an ancillary device 112 may be utilized for the collection of biometric reading data. The ancillary device 112 may be, for example, a sensor in a housing substantially separate from the housing of the user device 102. The ancillary device 112 may be illustrated in phantom to illustrate how the ancillary device may be optional in various embodiments. For example, the ancillary device 112 may optionally collect biometric reading data in lieu of, or to supplement, the biometric reading data collected by the user device 102. The ancillary device 112 may be configured to be communicatively coupled with the user device via, for example, a wired or a wireless connection. Accordingly, the ancillary device 112 may also be any type of scanner or detector of biometric reading data, such as a heartrate scanner (e.g., a pulse oximeter or a sensor for an electrocardiogram or a MCG reading), a fingerprint scanner, a voice pattern scanner, an iris scanner, a facial recognition scanner, and the like. In certain embodiments, the biometric reading data collected by the ancillary device 112 may be of a different type than the biometric reading data collected by the user device 102. For example, the biometric reading data collected by the ancillary device may characterize a heartbeat (e.g., as a wearable heartbeat or heartrate scanner or monitor) while the biometric reading data collected by the user device may characterize a fingerprint. Then, both sets of biometric reading data may be combined into a single biometric code for further processing. In particular embodiments, this biometric code from two sets of biometric reading data may be more complex and unique than a biometric code from a single set of biometric reading data.

Figure 2:
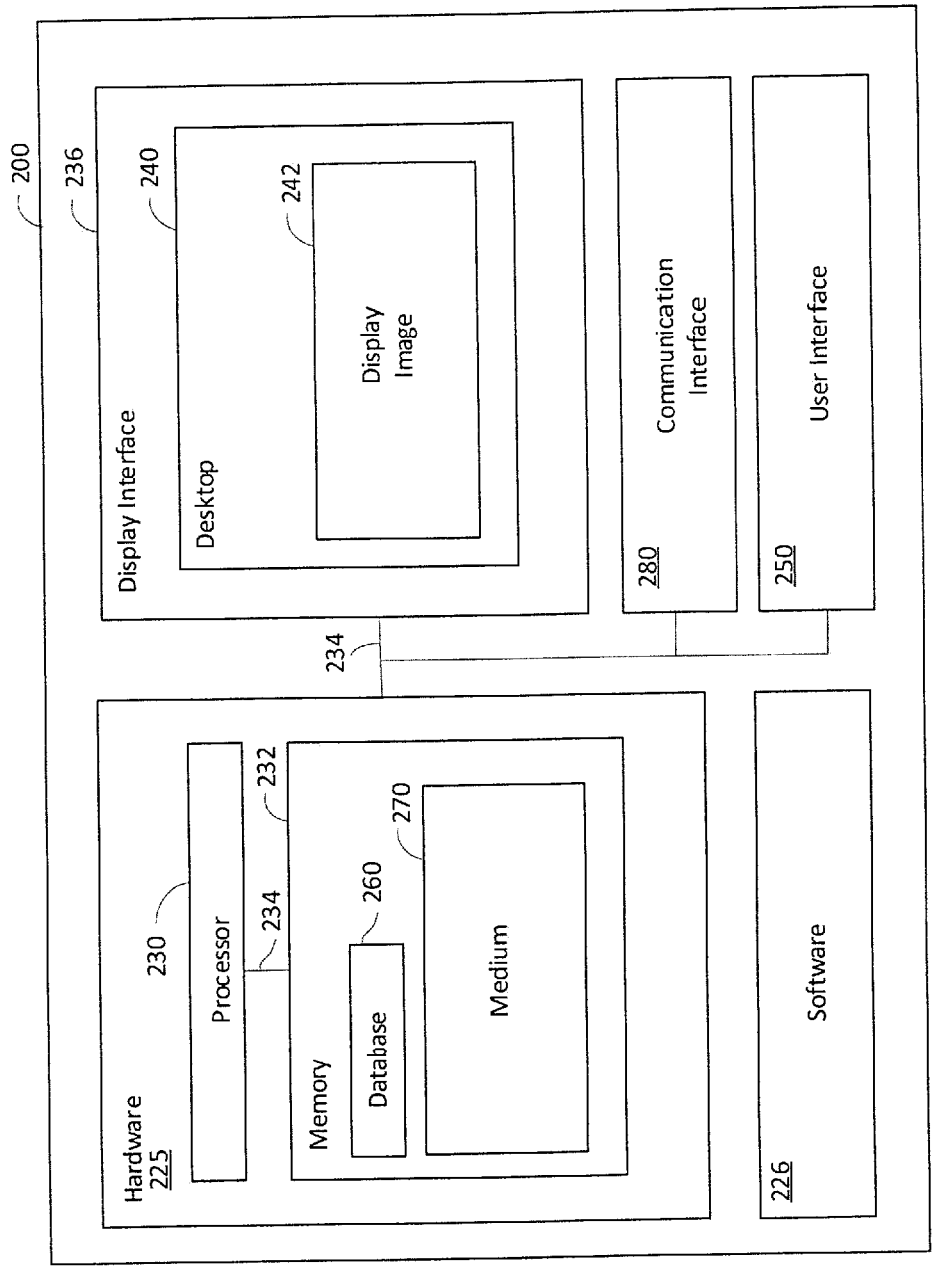
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular user device 102, server 108, receiver device 104, or ancillary device 112 as discussed above in connection with FIG. 1. Returning to FIG. 2, in some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an application specific integrated circuit (ASIC), a digital signal processor (DSP), an attached support processor (ASP), a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

In some embodiments, the computing device 200 can include a database 260 as a datastore within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a receiver device, a user device, an ancillary device, a server machine, smartphone, a laptop PC, a desktop PC, a tablet, a Google™ Android™ device, an iPhone®, an iPad®, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

For example, the communications interface 280 may include a magnetic interface for communication of specific patterns of magnetic flux between devices (e.g., between computing devices 200). As noted above, the magnetic interface may include an xMR array to generate variable magnetic flux via various flux components or flux generating coils (e.g., as a tank circuit). This xMR array may utilize a housing with triplicate shielding to shield the xMR array to reduce noise and increase reception and/or transmission of a desired signal (e.g., as magnetic flux). Also, in certain embodiments, the xMR array may also be utilized directly as a biometric reader configured to produce biometric reading data.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3A:
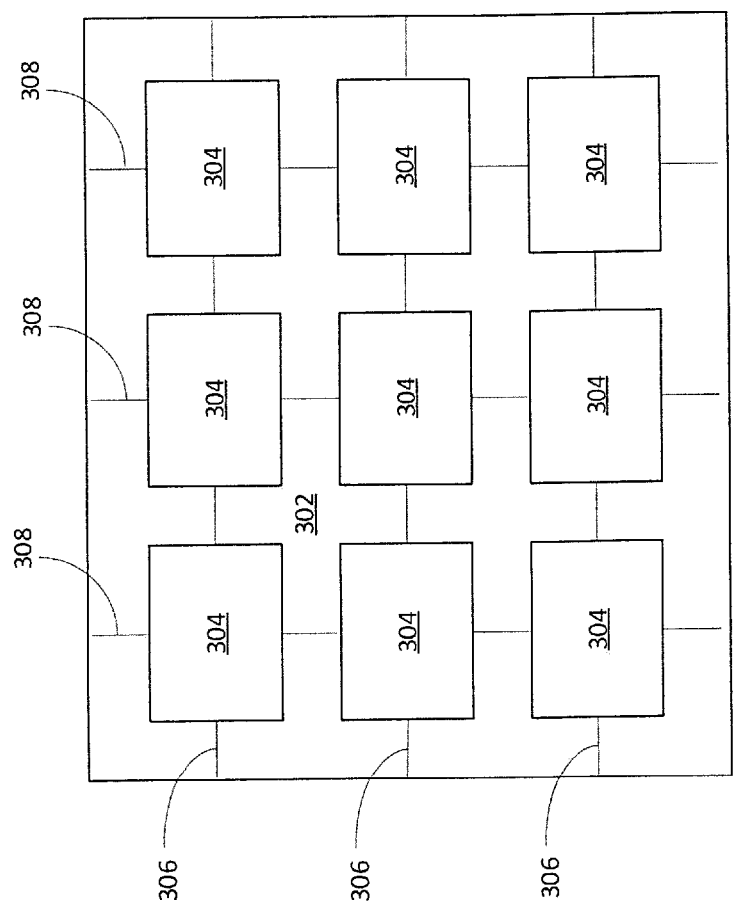
FIG. 3A is a block diagram illustrating a magnetic interface, in accordance with various embodiments.

FIG. 3A is a block diagram illustrating a magnetic interface as an implementation of the communications interface 280 of FIG. 2, in accordance with certain embodiments. Returning to FIG. 3A, the magnetic interface may include an xMR array 302 that includes multiple flux components 304. Each of the multiple flux components 304 and/or a combination of the flux components that make up the xMR array 302 may generate variable magnetic flux via respective flux components or flux generating coils (e.g., as a tank circuit). As will be discussed further below, this xMR array 302 may utilize a housing with triplicate shielding to shield the xMR array 302 to reduce noise and increase reception and/or transmission of a desired signal (e.g., as magnetic flux). Also, in certain embodiments, the xMR array 302 may also be utilized directly to produce biometric reading data In certain embodiments, the number of flux components 304 may be calibrated for the specific type of information to be transmitted over the magnetic interface. For example, an encoded payload that carries confidential financial information may be divided into sixteen parts, one for each digit of a credit card number. Each digit of the credit card number may be associated with a particular flux component 304. Although sixteen flux components may be described in particular embodiments, any number of flux components may be part of an xMR array as desired for different applications in various embodiments. For example, an xMR array may have nine flux components 304 as illustrated in FIG. 3A.

Furthermore, each of the flux components may be controlled by controlling either a row 306 or a column 308, whose combination may uniquely characterize and control a particular flux component. For example, each of the flux components 304 may be identified by a unique combination of a particular row 306 and a particular column 308. Accordingly, the amount of electrical potential or other parameter of a particular flux component 304 may be controlled or sensed by controlling or sensing the constituent row 306 and column 308 associated with the particular flux component 304. Also, each of the flux components 304 may either transmit (e.g., generate) or receive (e.g., resonate or sense) based on the magnetic flux transferred wirelessly between different flux components 304 of different xMR arrays 302 from different devices.

Figure 3B:
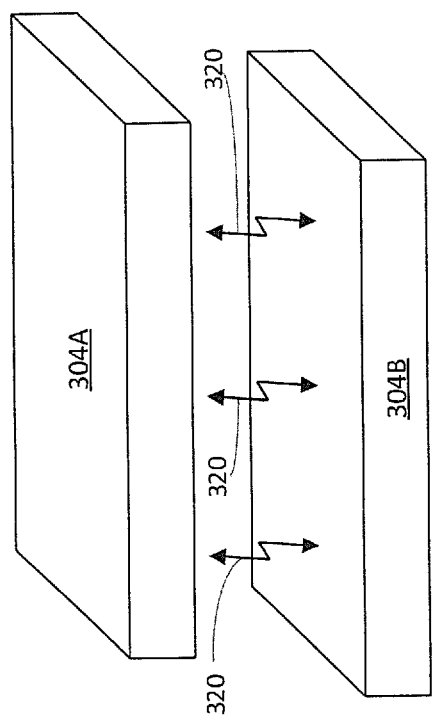
FIG. 3B is a block diagram illustrating magnetic flux between different flux components, in accordance with various embodiments.

FIG. 3B is a block diagram illustrating a magnetic interface 320 between different flux components 304A, 304B, in accordance with certain embodiments. The flux component 304A may be part of, for example, a user device and the flux component 304B may be part of, for example, a receiver device. Accordingly, the flux component 304A may be transmitting a signal as magnetic flux from the flux component 304A to the flux component 304B over a magnetic interface 320. Also, as noted above, the magnetic interface 320 between the flux component 304A and 304B that transfers signals via magnetic flux may require a sufficiently small distance for touch transactions that would not be susceptible to remote MITM attacks or other such interceptions.

Figure 4A:
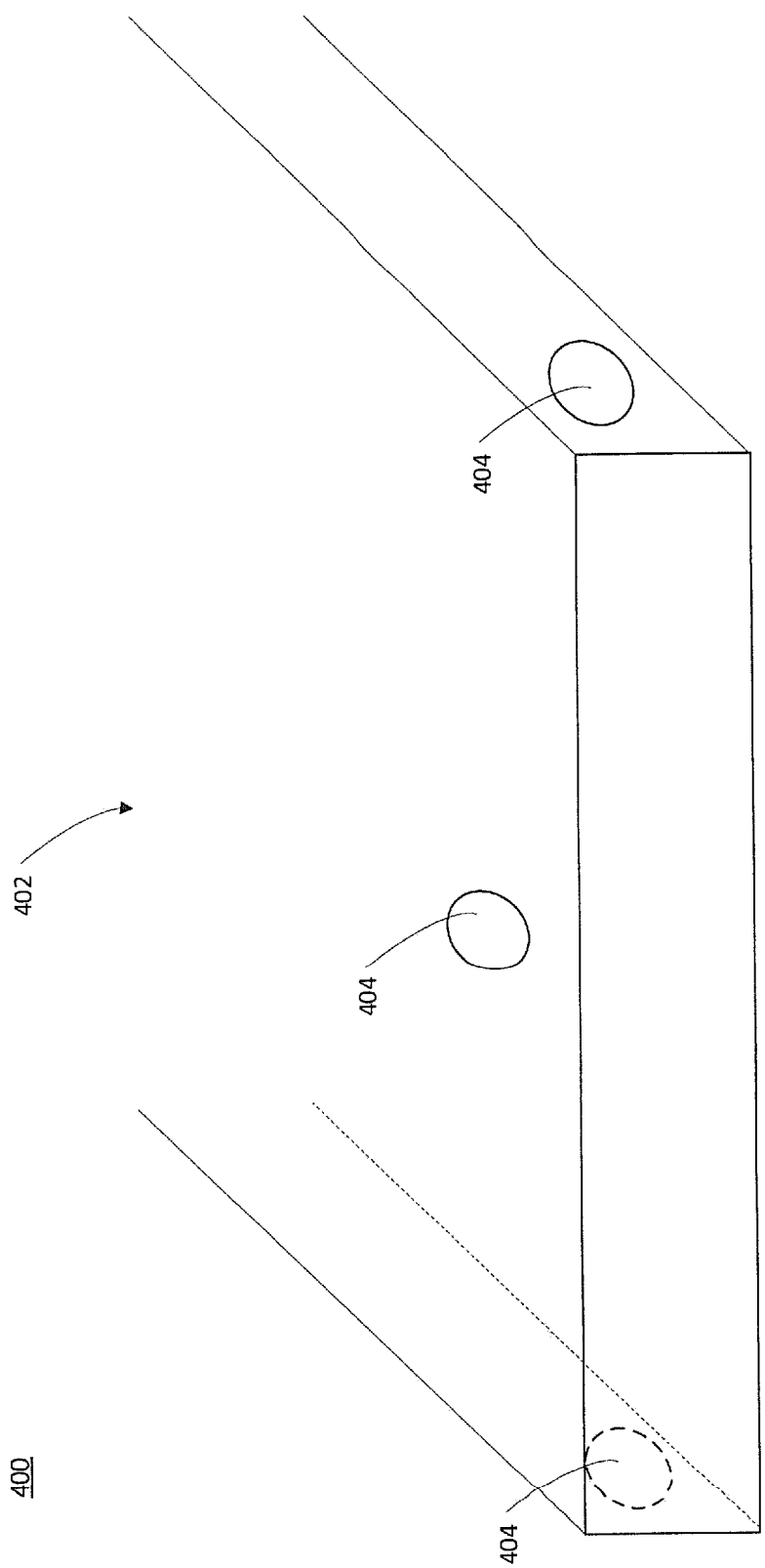
FIG. 4A is a perspective view block diagram of a user device configured to collected biometric reading data with a pulse oximeter that includes multiple laser emitting diodes (LEDs), in accordance with various embodiments.

FIG. 4A is a perspective view block diagram 400 of a user device 402 configured to collect biometric reading data with a pulse oximeter that includes multiple laser emitting diodes (LEDs) 404, in accordance with various embodiments. The pulse oximeter may be a scanner (e.g., a biometric reading data collection sensor) that monitors a user's oxygen saturation by passing a beam of light through the user's skin. The changes in light absorption, due to oxygenated or deoxygenated blood, may then be correlated to an oxygen saturation level and a heartrate. In the illustrated embodiment, the pulse oximeter may be implemented with three light emitting diodes (LEDs) 404, one on a front or back face of the user device (e.g., where the front face includes a primary user interface and where the back face is opposite the front face), and two on respective side faces (e.g., side faces of the user device that are not as wide as the front or back face). One of the LEDs 404 on an obscured side face of the user device 402 is illustrated, along with its respective side face, partially in phantom. In certain embodiments, a user may place a finger on each of the LEDs 404 for a set period of time for the pulse oximeter to collect the appropriate biometric reading data that may be converted into a biometric code for further processing by the user device 402.

Figure 4B:
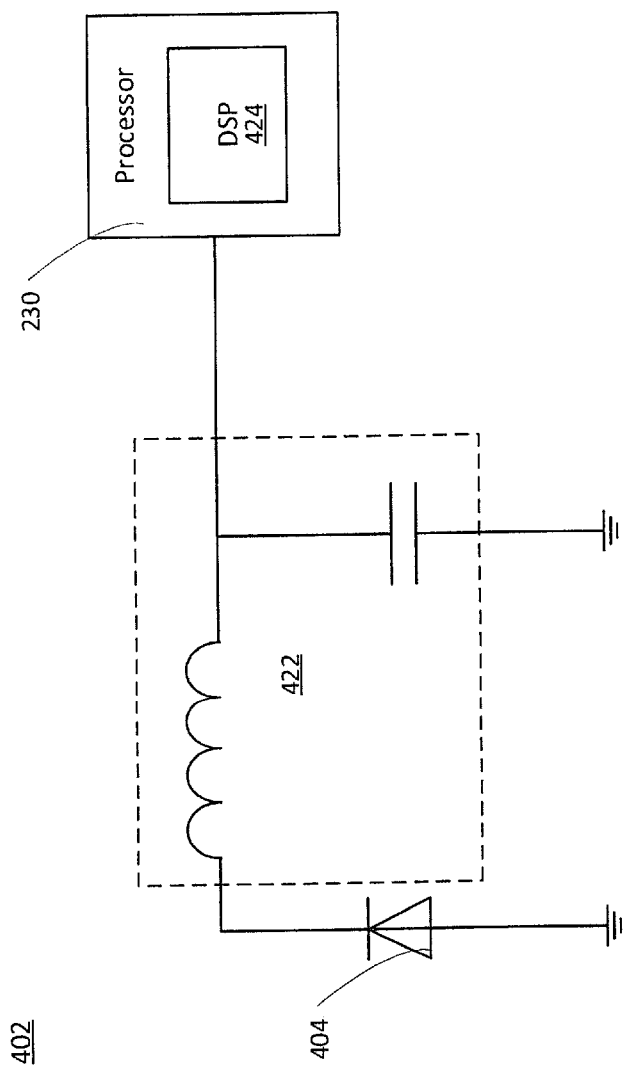
FIG. 4B is a block circuit diagram that illustrates a circuit level implementation of a pulse oximeter, in accordance with various embodiments.

FIG. 4B is a block circuit diagram that illustrates a circuit level implementation of the pulse oximeter 410 with the user device of FIG. 4A, in accordance with various embodiments. Returning to FIG. 4B, the pulse oximeter may include at least one LED 404, which may be coupled to a filter circuit 422 (illustrated as an area within dotted lines), which may be connected to the processor 230 as a component of the user device 402, as discussed above. The filter circuit 422 may be implemented with a capacitor and an inductor. The processor 230 may include a DSP 424 to convert analog signals to digital signals for further processing by the user device.

FIG. 5A is a perspective view block diagram 500 of a user device 502 configured to collect biometric reading data with a magnetoresistance (xMR) array 504, in accordance with various embodiments. In certain embodiments, the xMR array 504 may be part of an array housing 506 that houses the xMR array 504 to reduce noise and increase the signal (e.g., magnetic flux 508) as induced by the xMR array 504 to concentrate at an xMR portal 510. The xMR portal 510 may be an externally facing interface point for the xMR array 504 as it sits within the array housing 506. The xMR portal 510 may also be referred to as a flux concentrator as the xMR portal 510 may be a point along the user device 502 and/or the array housing 506 in which magnetic flux is concentrated.

In certain embodiments, a user may place the user's skin (e.g., as a finger or other body part) at the interface at the xMR portal 510 for a set period of time. Then, based on implication of electrical signals detectible from the user's skin, the xMR array 504 may take an electrocardiography (ECG) reading (e.g., an electrocardiogram) or a magneto-cardiography (MCG) reading as biometric reading data that may be converted into a biometric code for further processing by the user device 502. This biometric reading data may be based on a heartbeat of the user, such as a number of beats per second or a QRS complex based on the heartbeat.

Figure 5B:
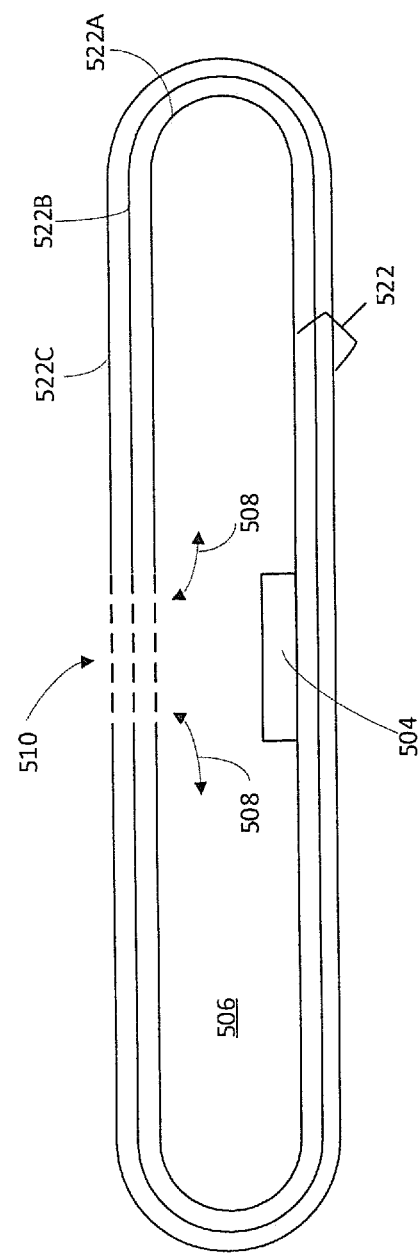
FIG. 5B is a side view of the user device configured to collected biometric reading data with the xMR array, in accordance with various embodiments.

FIG. 5B is a side view 520 of the user device 502 configured to collect biometric reading data with the magnetoresistance (xMR) array 504, in accordance with various embodiments. As noted above, in certain embodiments, the xMR array 504 may be part of an array housing 506 that houses the xMR array 504 to reduce noise and increase the signal (e.g., magnetic flux 508) induced by the xMR array 504 to concentrate at an xMR portal 510. The array housing 506 may include triplicate walls 522 of three discrete materials. These triplicate walls 522 may be substantially concentric. These three discrete materials may each be different materials or may include at least two materials that are the same. For example, in certain embodiments, the triplicate walls 522 may be made of an inner wall 522A of nickel (Ni), an intermediate wall 522B of aluminum (Al), and an outer wall 522C of Al. Also, the thicknesses of each of the triplicate walls may be different. For example, the triplicate walls 522 may include increasing thickness from the inner wall to the outer wall (e.g., where the inner wall is the thickest) or decreasing thickness from the inner wall to the outer wall (e.g., where the inner wall is the thinnest). Also, in certain embodiments, at least two of the walls of the triplicate walls 522 may be adjacent to each other (e.g., touching). However, in other embodiments at least two of the triplicate walls may be separated by spacers (e.g., materials spacing the walls from each other) such two of the triplicate walls are substantially spaced from each other by an open space. Although in certain embodiments the walls of the array housing 506 are described as having triplicate walls, the walls of the array housing 506 may have any number of walls and/or materials as desired for different applications in a variety of embodiments. For example, in further embodiments the walls of the array housing may have only two walls or may have four or more walls. Also, in further embodiments, certain walls may share the same materials with other walls or may be made of different materials from other walls.

Figure 5C:
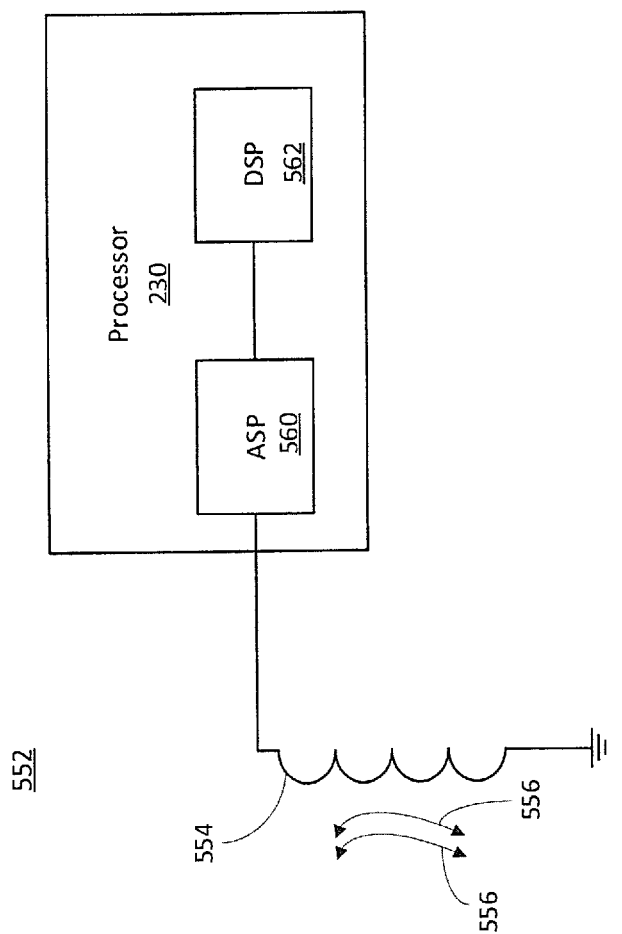
FIG. 5C is a block circuit diagram that illustrates a circuit level implementation of a user device configured to collected biometric reading data with an xMR array, in accordance with various embodiments.

FIG. 5C is a block circuit diagram that illustrates a circuit level implementation of a user device 552 configured to collect biometric reading data with a magnetoresistance (xMR) array 554, in accordance with various embodiments. The xMR array 554 may be represented in the circuit diagram an inductor which may generate magnetic flux 556. The xMR array 554 may be connected to the processor 230 as a component of the user device 402, as discussed above. The processor 230 may include an ASP 560 and a DSP 562. The xMR array 554 may be connected to the ASP 560, which is also coupled to the DSP 562. The DSP may convert analog signals from the xMR array 554 to appropriate digital signals for further processing by the user device 552.

Figure 6A:
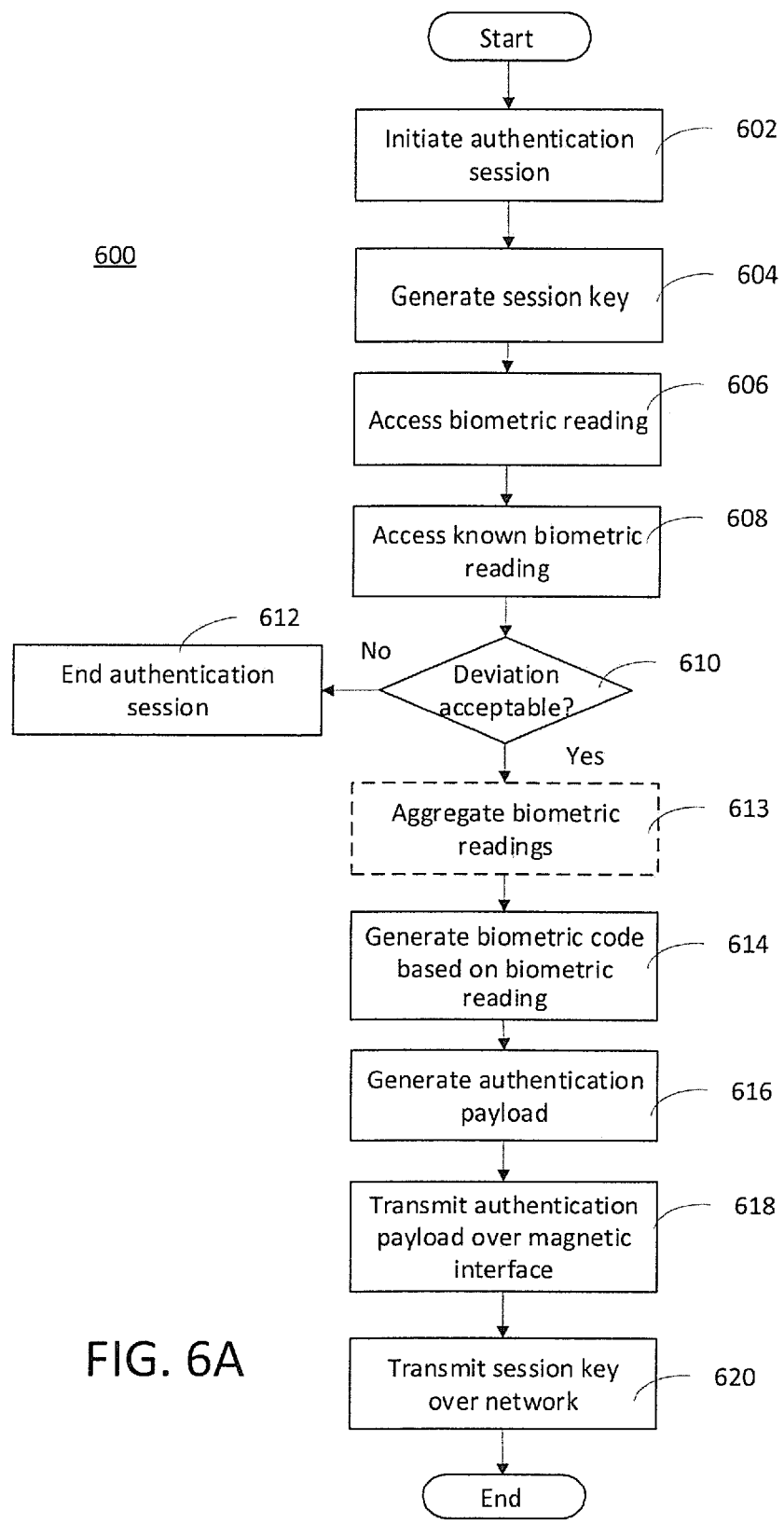
FIG. 6A is a flow chart of a secure transmission process, in accordance with various embodiments.

FIG. 6A is a flow chart of a secure transmission process 600, in accordance with various embodiments. The process 600 may be performed at a user device, as introduced above. It is noted that the process 600 is merely an example, and is not intended to limit the present disclosure. Accordingly, it is understood that additional operations (e.g., blocks) may be provided before, during, and after the process 600 of FIG. 6A, certain operations may be omitted, certain operations may be performed concurrently with other operations, and that some other operations may only be briefly described herein.

At block 602, an authentication session may be initiated at the user device. The authentication session may be a single session of the secure transmission process 600 associated with a particular transaction. This transaction may be of a confidential or sensitive nature such that authentication is desired. For example, this transaction may be a financial transaction where an instruction or request for monetary transaction is being performed. In certain embodiments, the authentication session may be a single session of the secure transmission process 600. By being a single session, certain information generated as part of this single session is not stored and/or retrieved for future use in a future authentication session.

At block 604, a session key may be generated in response to initiating the authentication session. The session key may be a string of random numbers generated to reflect the independence of the single session from other sessions (e.g., future sessions). Stated another way, this string of random numbers may be used to differentiate different authentication sessions such that each authentication session may be associated with a different session key. Also, as will be discussed further below, this session key may be utilized to generate a transmitter authentication payload. In certain embodiments, the session key may be generated by a random number generator at the user device. In various embodiments, the session key may be associated with a particular user, such that a user identifier for the user (e.g., an authorized user of the user device) that initiates the authentication session is associated with, and accompanies, the session key in storage and transmission.

At block 606, the user device may perform or access a biometric reading to collect current biometric reading data. As noted above, the biometric reading data may be produced from any type of scanner or detector of biometric reading data on the user device, such as a heartrate scanner (e.g., a pulse oximeter or a sensor for an electrocardiogram or a magnetocardiography (MCG) reading), a fingerprint scanner, a voice pattern scanner, an iris scanner, a facial recognition scanner, and the like. Also, the biometric reading may be any type of scan or reading that may uniquely identify a user of the user device. For example, the biometric reading data may be of any type of unique biometric pattern, such as a fingerprint, a face, an iris pattern, a heartrate, a voice pattern, and the like. In certain embodiments, the biometric reading data may be a QRS complex that represents polarization of a heart's right and left ventricles. Such polarization may be utilized to uniquely characterize a user based on various variations of the QRS complex, such as a intervals of a R wave (e.g., an RR interval), or intervals of a PP wave (e.g., a PP interval). Also, the biometric reading data may be physically collected directly at the user device or at an ancillary device connected with the user device in an authorized manner (e.g., over a secure or authorized connection with the user device).

At block 608, known biometric reading data may be accessed. This known biometric reading data may be stored biometric reading data that characterizes an authorized user of the user device. Accordingly, in certain embodiments, this known biometric reading data may be more simply referred to as stored biometric reading data. For example, the known biometric reading data may be from a previously collected biometric reading from a previous session. In certain embodiments, this known biometric reading data may be an aggregated representation of all or some of the previously collected biometric reading data. For example, this aggregated representation may be from the biometric reading data collected from the past 10 sessions at the user device or from all of the past sessions at the user device. In certain embodiments, this aggregated representation may be from biometric reading data that was previously measured in past sessions to be within an acceptable deviation from predetermined biometric reading data of the authorized user of the user device. In other embodiments, the known biometric reading data may be stored biometric reading data accessible to the user device from a local datastore or a remote datastore over a network. In various embodiments, the known biometric reading data may be retrieved (e.g., fetched) using a user identifier for the user (e.g., the authorized user of the user device) that initiates the authentication session.

At block 610, a decision may be made as to whether the deviation between the current biometric reading data of block 606 and the known biometric reading data of block 608 are within an acceptable deviation of each other. For example, the current biometric reading data may be analyzed to determine whether particular signals associated with the current biometric reading data meet a criteria. The criteria may be, for example, whether particular signals associated with the current biometric reading data are within a threshold value range of deviation (e.g., a failure threshold) from corresponding (e.g., related) signals associated with the known biometric reading data. As a more specific example, current biometric reading data that is representative of a QRS complex may be compared with known biometric reading data that is also representative of a QRS complex. The QRS complex values may be compared to determine whether they are within an acceptable deviation or range of each other. For example, the comparison of QRS complex values may be of differences between a PP interval, an RR interval, or a percentage of differences between adjacent normal RR intervals that are greater than 50 milliseconds (pNN50) between the current biometric reading data and the known biometric reading data. If the deviation is within an acceptable range, then the process 600 may proceed to block 613. However, if the deviation is not within an acceptable range, the process 600 may proceed to block 612. In certain embodiments, the deviation being within an acceptable range may be representative of the current biometric reading data reflecting that of an authorized user while the deviation being outside of the acceptable range may be representative of the current biometric reading data reflecting that of an unauthorized user (e.g., a user other than an authorized user or expected user of the user device).

At block 612, the authentication session may end due to the deviation between the current biometric reading data of block 606 and the known biometric reading data of block 608 not being within an acceptable range. As noted above, in certain embodiments, the deviation being within an acceptable range may be representative of the current biometric reading data reflecting that of an authorized user while the deviation being outside of the acceptable range may be representative of the current biometric reading data reflecting that of an unauthorized user (e.g., a user other than an authorized user or expected user of the user device). In certain embodiments, the session key generated in block 604, and accompanying user identifier, may be discarded as part of ending the authentication session.

At block 613, optionally, the current biometric reading may be aggregated with the known biometric readings. This may occur in optional embodiments in which the known biometric reading is an aggregate of biometric readings in past sessions. This aggregation may be performed in any manner of aggregating different values to create an averaged or nominal value reflective of the constituent values of the aggregation. For example, the values associated with the known biometric reading data may be combined with corresponding values associated with the current biometric data. Then the combination may be averaged to produce aggregated biometric reading data that may be utilized in future sessions as known biometric reading data. Block 613 is illustrated with dotted lines to indicate that this block is an optional block for certain embodiments. In embodiments in which block 613 is not practiced, the process 600 may skip over block 613 and proceed to block 614 directly.

At block 614, a biometric code may be generated based on the current biometric reading taken in block 606. This biometric code may be generated in predetermined manner based on the current biometric reading data or the known biometric reading data. For example, the biometric code may represent certain values within the current or known biometric reading data as converted to a digital code. Accordingly, this biometric code may be specific to an authorized user's biometric reading data.

At block 616, a transmitter authentication payload may be generated based on the session key generated in block 604 and the biometric code generated in block 614. In certain embodiments, this transmitter authentication payload may include an encoding and/or a scrambling based on (e.g., using) the session key generated in block 604 and the biometric code generated in block 614. This encoding and/or scrambling may be performed in a predetermined way such that the transmitter authentication payload may be reproduced when the constituent session key and biometric code are known.

At block 618, the transmitter authentication payload may be transmitted over a magnetic interface. As noted above, the magnetic interface may be between machines (e.g., a user device and receiver device of the transmitter authentication payload). Also, the magnetic interface may facilitate the transmission of signals via magnetic flux. Thus, these signals may be transmitted in a manner requiring a sufficiently small distance for touch transactions that would not be susceptible to remote MITM attacks or other such interceptions. This magnetic flux may be transferred via a xMR array at both the user device and at the receiver device. The xMR array may generate variable magnetic flux via various flux generating components or coils (e.g., as a tank circuit). In certain embodiments, these xMR arrays may utilize a housing with triplicate shielding to shield the xMR array to reduce noise and increase reception and/or transmission of a desired signal (e.g., as magnetic flux). Also, in certain embodiments, the xMR array may also be utilized directly as a reader or scanner configured to produce the current biometric reading data.

At block 620, the session key generated in block 604, and accompanying user identifier, may be transmitted over a network. As noted above, both the user device and the receiver device may be connected over a network, such as the Internet. The network may be separate from the magnetic interface, such that transmission over the magnetic interface does not infer transmission over the network, and vice-versa. Accordingly, the session key with accompanying user identifier may be transmitted over the network and the transmitter authentication payload may be separately transmitted over the magnetic interface.

Figure 6B:
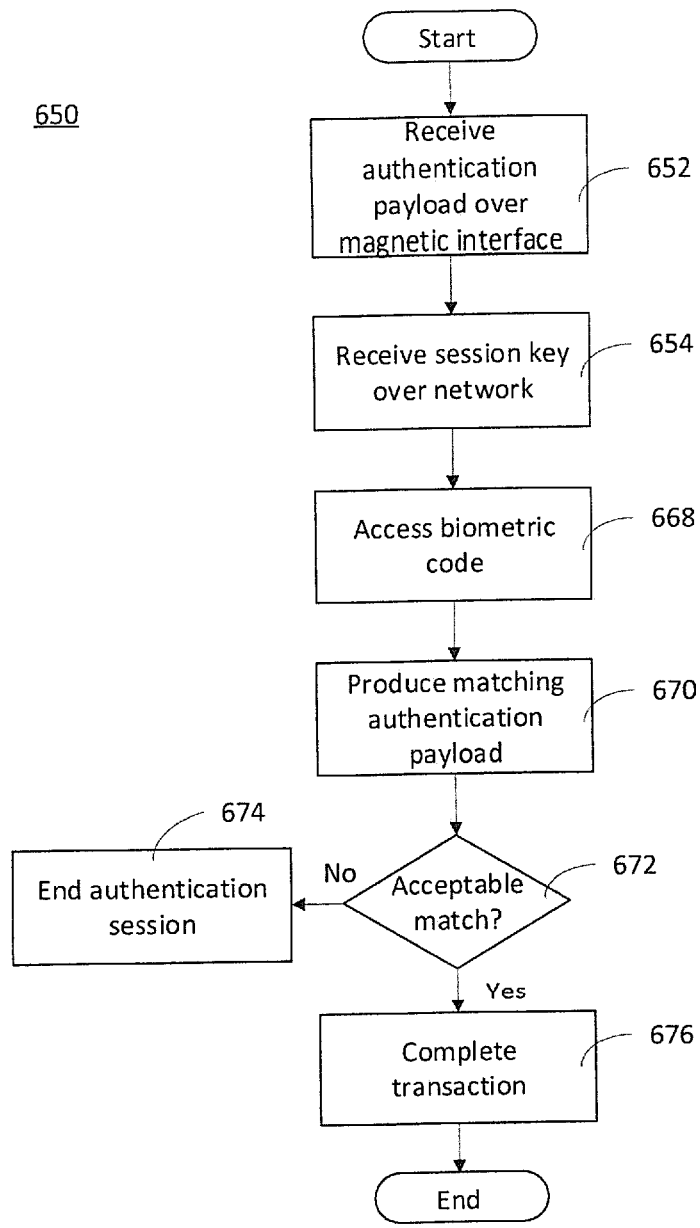
FIG. 6B is a flow chart of a secure receiver process, in accordance with various embodiments.

FIG. 6B is a flow chart of a secure receiver process 650, in accordance with various embodiments. The process 650 may be performed at a receiver device, as introduced above. It is noted that the process 650 is merely an example, and is not intended to limit the present disclosure. Accordingly, it is understood that additional operations (e.g., blocks) may be provided before, during, and after the process 650 of FIG. 6B, certain operations may be omitted, certain operations may be performed concurrently with other operations, and that some other operations may only be briefly described herein. Also, certain embodiments referenced in FIG. 6B may reference aspects of the secure transmission process 600 in continuation of FIG. 6A, above.

At block 652, the receiver device may receive the transmitter authentication payload referenced above in blocks 616 and 618 of FIG. 6A, above. As noted above, this transmitter authentication payload may be generated based on the session key generated in block 604 and the biometric code generated in block 614. The session key may have an accompanying user identifier. Also, the transmitter authentication payload may be transmitted over the magnetic interface such that signals (e.g., the signals carrying the transmitter authentication payload) may be transmitted via magnetic flux.

Returning to FIG. 6B, at block 654, the receiver device may receive the session key over the network, as referenced in blocks 604 and 620 of FIG. 6A, above. As noted above, the session key may be generated in response to initiating the authentication session and be accompanied by a user identifier. The session key may be a string of random numbers generated to reflect the independence of the single session as a standalone session. Stated another way, this string of random numbers may be used to differentiate different authentication sessions as each authentication session may be associated with a different session key. Also, the session key may be transmitted over the network, while the transmitter authentication payload may be separately transmitted over the magnetic interface.

Returning to FIG. 6B, at block 668, a known biometric code may be accessed. This biometric code may be the same or similar to the biometric code discussed above used in the generation of the transmitter authentication payload. For example, the known biometric code may be generated from a known biometric reading of an authorized user of the user device. This known biometric code may be previously generated from previously collected biometric reading data of the authorized user. In various embodiments, the known biometric code may be stored in a datastore accessible to the receiver device such that the receiver device may retrieve (e.g., fetch) the known biometric code from the datastore in the performance of block 668. This known biometric code may be retrieved (e.g., fetched) using the user identifier accompanying the session key. In certain embodiments, the datastore may be located locally with the receiver device or may be remote to the receiver device such that the datastore that stores the known biometric code may be accessible to the receiver device via a network, such as the Internet. In particular embodiments, the known biometric code at block 668 may be generated from the same biometric reading data as that of block 608 (see FIG. 6A), such as where the known biometric reading data of block 608 and the biometric reading data utilized to generate the biometric code of block 668 (see FIG. 6B) are the same. For example, that same biometric reading data may be stored in a datastore accessible to both the user device and the receiver.

At block 670, a matching authentication payload may be produced (e.g., generated) based on the received session key of block 654 and the accessed biometric code of block 668. As noted above, an authentication payload may be generated based on a session key and a biometric code. Accordingly, the receiver device may generate a matching authentication payload based on the received session key of block 654 and the accessed biometric code of block 668. In certain embodiments, this matching authentication payload may include an encoding and/or a scrambling based on (e.g., using) the session key and the biometric code in the same predetermined way that the transmitter authentication payload (e.g., the transmitter authentication payload of block 652), was generated.

At block 672, a decision may be made as to whether the matching authentication payload and the transmitter authentication payload meet certain criteria to be an acceptable match (e.g., if they are within an acceptable range of deviation from each other). For example, in certain embodiments, the matching authentication payload and the transmitter authentication payload may be analyzed to determine whether values associated with each are within a threshold value range of deviation from each other (e.g., within a failure threshold). However, in certain embodiments, this threshold value range may be a range of zero or none, such that block 672 is a determination of whether the matching authentication payload and the transmitter authentication payload are an exact match. In certain embodiments, having the values within a threshold value range of deviation from each other may be representative of the transmitter authentication payload being of an expected session (e.g., as indicated by a particular session key) and of an authorized user of the user device (as indicated by the biometric code and/or associated biometric reading data). If the matching authentication payload and the transmitter authentication payload are not an acceptable match, then the process 650 may proceed to block 674. However, if the matching authentication payload and the transmitter authentication payload are an acceptable matching, then the process 650 may proceed to block 676.

At block 674, the authentication session may end. By ending the authentication session without completing a transaction, the transaction that was initiated at the receiver device (see FIG. 6A, block 602) may not be completed. Ending the authentication session in this manner may be indicative of some degree of tampering or other undesirable interference or condition, as representative of the transmitter authentication payload not being of an expected session (e.g., as indicated by a particular session key) and/or of an unauthorized user of the user device (as indicated by the biometric code and/or associated biometric reading data). In certain embodiments, the session key received in block 654 and/or the transmitter authentication payload received in block 652 may be discarded as part of ending the authentication session.

At block 676, the receiver device may complete the transaction that was initiated at the user device (see FIG. 6A, block 602). As noted above, this transaction may be of a confidential or sensitive nature, such that authentication is desired. For example, this transaction may be a financial transaction where an instruction or request for a monetary transfer is being performed. Also, by undergoing the process 650, the transaction may be performed with the security that the transaction is being completed as associated with an expected session (e.g., as indicated by a particular session key) and of an authorized user of the user device (as indicated by the biometric code and/or associated biometric reading data).

Figure 7A:
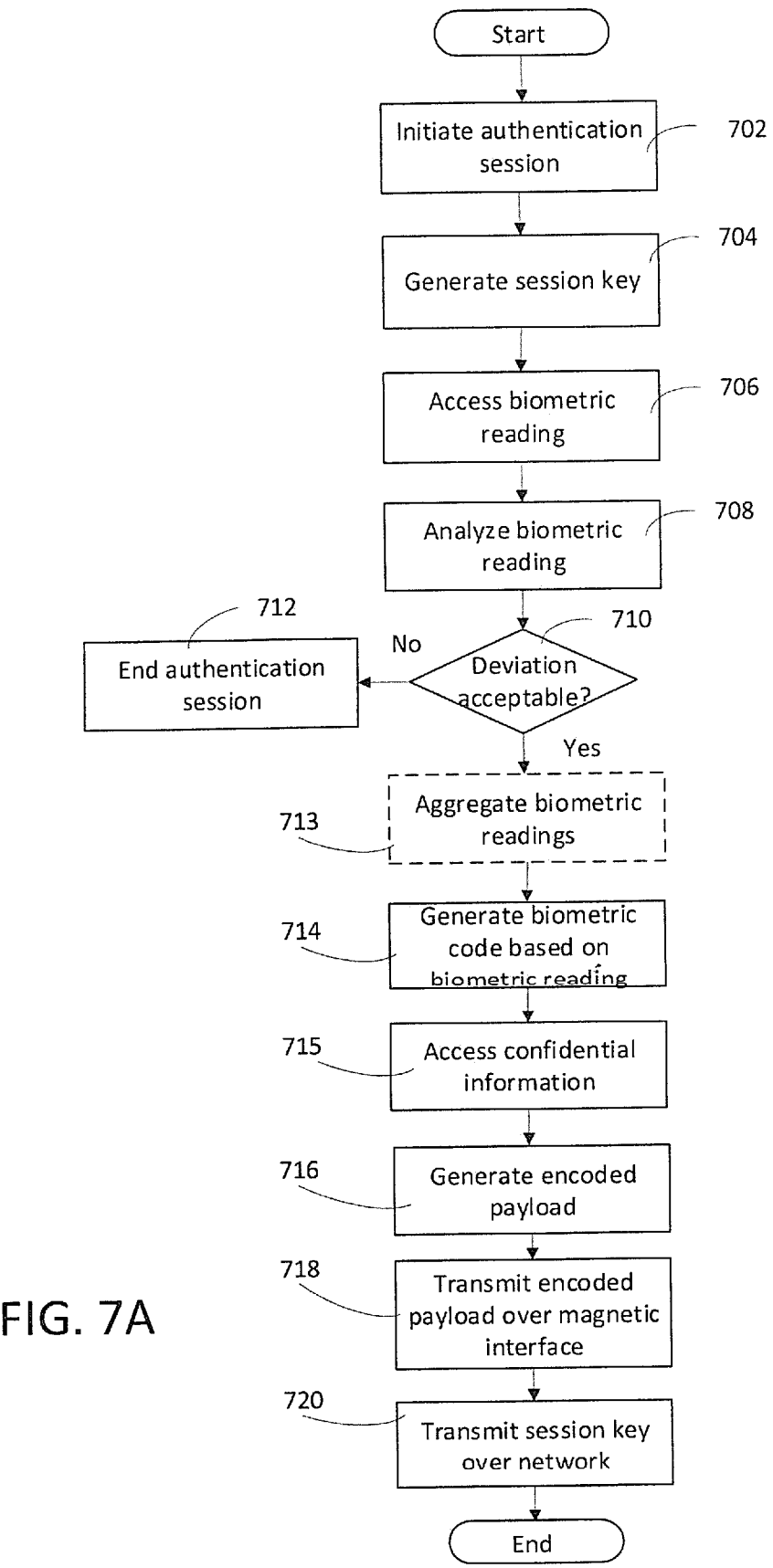
FIG. 7A is a flow chart of a secure encoding process, in accordance with various embodiments.

FIG. 7A is a flow chart of a secure encoding process 700, in accordance with various embodiments. The process 700 may be performed at a user device, as introduced above. It is noted that the process 700 is merely an example, and is not intended to limit the present disclosure. Accordingly, it is understood that additional operations (e.g., blocks) may be provided before, during, and after the process 700 of FIG. 7A, certain operations may be omitted, certain operations may be performed concurrently with other operations, and that some other operations may only be briefly described herein. Also, various operations may be reflective of similar operations already discussed above in connection with FIG. 6A. Accordingly, certain aspects of these above mentioned operations may be repeated below for completeness.

Returning to FIG. 7A, at block 702, an authentication session may be initiated at the user device. The authentication session may be a single session of the secure encoding process 700 associated with a particular transaction. This transaction may be of a confidential or sensitive nature, such that authentication is desired. For example, this transaction may be a financial transaction where an instruction or request for monetary transaction is being performed. In certain embodiments, information generated as part of this single authentication session is not stored and/or retrieved for future use in a future authentication session. Stated another way, the authentication session may be a standalone session that is not entirely dependent upon a different session.

At block 704, a session key may be generated in response to initiating the authentication session. The session key may be a string of random numbers generated to reflect the independence of the single authentication session as a stand-alone session. This string of random numbers may be used to differentiate different authentication sessions as each authentication session may be associated with a different session key. Also, as will be discussed further below, this session key may be utilized to generate an authentication payload. In certain embodiments, the session key may be generated by a random number generator at the user device. In various embodiments, the session key may be associated with a particular user, such that a user identifier for the user (e.g., an authorized user of the user device) that initiates the authentication session is associated with, and accompanies, the session key in storage and transmission.

At block 706, the user device may perform or access a biometric reading to collect current biometric reading data. As noted above, the biometric reading data may be produced from any type of scanner or detector of biometric reading data, such as a heartrate scanner (e.g., a pulse oximeter or a sensor for an electrocardiogram or a MCG reading), a fingerprint scanner, a voice pattern scanner, an iris scanner, a facial recognition scanner, and the like. Also, the biometric reading may be any type of scan or reading that may uniquely identify a user of the user device. For example, the biometric reading data may be of any type of unique biometric pattern, such as a fingerprint, a face, an iris pattern, a heartrate, a voice pattern, and the like. In certain embodiments, the biometric reading data may be a QRS complex that represents polarization of a heart's right and left ventricles. This polarization may be utilized to uniquely characterize a user based on various variations of the QRS complex, such as a intervals of a R wave (e.g., an RR interval), or intervals of a PP wave (e.g., a PP interval). Also, the biometric reading data may be physically collected directly at the user device or at an ancillary device connected with the user device in an authorized manner (e.g., over a secure or authorized connection with the user device).

At block 708, known biometric reading data may be accessed. This known biometric reading data may be stored biometric reading data that characterizes an authorized user of the user device. For example, the known biometric reading data may be from a previously collected biometric reading from a previous session. In certain embodiments, this known biometric reading data may be an aggregated representation of all or some of the previously collection biometric reading data. For example, this aggregated representation may be from the biometric reading data collected from the past 10 sessions at the user device or from all of the past sessions at the user device. This aggregated representation may be from biometric reading data that was previously measured in past sessions to be within an acceptable deviation from predetermined biometric reading data of the authorized user of the user device. In other embodiments, the known biometric reading data may be stored biometric reading data accessible to the user device from a local datastore or a remote datastore over a network. In various embodiments, the known biometric reading data may be retrieved (e.g., fetched) using a user identifier for the user (e.g., the authorized user of the user device) that initiates the authentication session.

At block 710, a decision may be made as to whether the deviation between the current biometric reading data of block 706 and the known biometric reading data of block 708 are within an acceptable deviation of each other. For example, the current biometric reading data may be analyzed to determine whether particular signals associated with the current biometric reading data meet a criteria. The criteria may be, for example, whether particular signals are within a threshold value range of deviation from corresponding signals associated with the known biometric reading data (e.g., within a failure threshold). As a more specific example, current biometric reading data that is representative of a QRS complex may be compared with known biometric reading data that is also representative of a QRS complex. The QRS complex values may be compared to determine whether they are within an acceptable deviation or range of each other. For example, the comparison of QRS complex values may be of differences between a PP interval, an RR interval, or a percentage of differences between adjacent normal RR intervals that are greater than 50 milliseconds (pNN50) between the current biometric reading data and the known biometric reading data. If the deviation is within an acceptable range, then the process 700 may proceed to block 713. However, if the deviation is not within an acceptable range, the process 700 may proceed to block 712. In certain embodiments, the deviation being within an acceptable range may be representative of the current biometric reading data reflecting that of an authorized user while the deviation being outside of the acceptable range may be representative of the current biometric reading data reflecting that of an unauthorized user (e.g., a user other than an authorized user or expected user of the user device).

At block 712, the authentication session may end due to the deviation between the current biometric reading data of block 706 and the known biometric reading data of block 708 not being within an acceptable range. As noted above, in certain embodiments, the deviation being within an acceptable range may be representative of the current biometric reading data reflecting that of an authorized user while the deviation being outside of the acceptable range may be representative of the current biometric reading data reflecting that of an unauthorized user (e.g., a user other than an authorized user or expected user of the user device). In certain embodiments, the session key generated in block 704, and accompanying user identifier, may be discarded as part of ending the authentication session.

At block 713, optionally, the current biometric reading may be aggregated with the known biometric readings. This may occur in optional embodiments in which the known biometric reading data is an aggregate of biometric reading data from past sessions. This aggregation may be performed in any manner of aggregating different values to create an averaged or nominal value reflective of the constituent values of the aggregation. For example, the values associated with the known biometric reading data may be combined with corresponding values associated with the current biometric reading data. Then, the combination may be averaged to produce aggregated biometric reading data that may be utilized in future sessions as known biometric reading data. Block 713 is illustrated with dotted lines to indicate that this block is an optional block for certain embodiments. In embodiments in which block 713 is not practiced, the process 700 may skip over block 713 and proceed to block 714 directly.

At block 714, a biometric code may be generated based on the current biometric reading taken in block 706. This biometric code may be generated in predetermined manner based on the current biometric reading data or the known biometric reading data. For example, the biometric code may represent certain values within the current or known biometric reading data as converted to a digital code.

Accordingly, this biometric code may be specific to an authorized user's biometric reading data.

At block 715, confidential information may be accessed. This confidential information may be associated with the particular transaction of the secure encoding process 700. As noted above, this transaction may be of a confidential or sensitive nature, such that security or sensitivity is desired. Accordingly, the secure encoding process 700 may access this confidential information for encoding and transmission in a secure or sensitive manner. In certain embodiments, this confidential information may be credit card information (e.g., a credit card number), bank account information (e.g., a routing number, account number, and/or a check number associated with a bank account), protected health information (PHI), or other confidential information that the transaction is configured to handle in a secure or sensitive manner.

At block 716, an encoded payload may be generated based on the session key generated in block 704, the biometric code generated in block 714, and the confidential information accessed in block 715. In certain embodiments, this encoded payload may include an encoding and/or a scrambling based on (e.g., using) the session key generated in block 704, the biometric code generated in block 714, and the confidential information accessed in block 715. This encoding and/or scrambling may be performed in a predetermined way such that the encoded payload may be decoded when the constituent session key and biometric code are known.

In various embodiments, this encoded payload may be encoded into parts such that the various parts of the encoded payload may be transmitted using different magnetic flux components of an xMR array of the user device over a magnetic flux interface, as discussed above. In certain embodiments, the number of different parts may be reflective of a number of different parts of the confidential information of block 715, such as 16 parts to represent 16 digits of a credit card number.

At block 718, the encoded payload may be transmitted over a magnetic interface. As noted above, the magnetic interface may be between machines (e.g., a user device and receiver device of the encoded payload). The magnetic interface may facilitate the transmission of signals via magnetic flux. Thus, these signals may be transmitted in a manner requiring a sufficiently small distance for touch transactions that would not be susceptible to remote MITM attacks or other such interceptions. This magnetic flux may be transferred via a xMR array at both the user device and at the receiver device which may generate variable magnetic flux via various flux components or flux generating coils (e.g., as a tank circuit). In certain embodiments, these xMR arrays may utilize a housing with triplicate shielding to shield the xMR array to reduce noise and increase reception and/or transmission of a desired signal (e.g., as magnetic flux). Also, in certain embodiments, the xMR array may also be utilized directly as a reader or scanner configured to produce the current biometric reading data.

At block 720, the session key generated in block 704, and accompanying user identifier, may be transmitted over a network. As noted above, both the user device and the receiver device may be connected over a network, such as the Internet. The network may be separate from the magnetic interface, such that transmission over the magnetic interface does not infer transmission over the network, and vice-versa. Accordingly, the session key with accompanying user identifier may be transmitted over the network and the encoded payload may be separately transmitted over the magnetic interface.

Figure 7B:
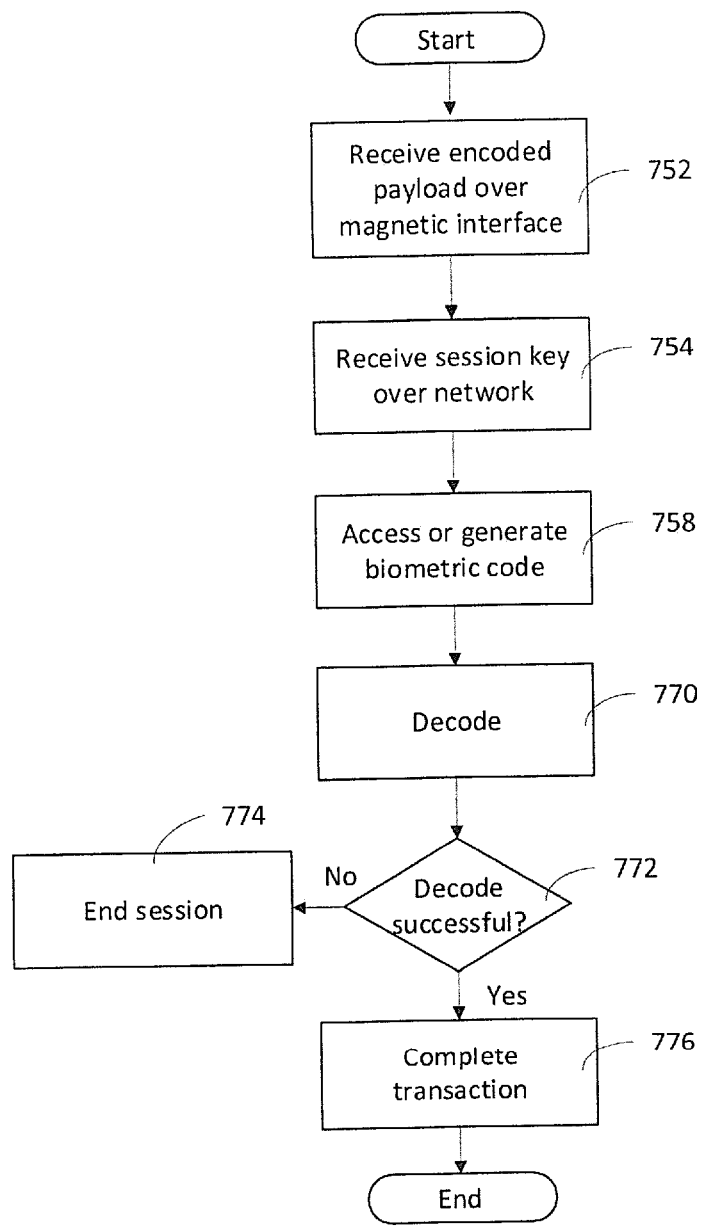
FIG. 7B is a flow chart of a secure decoding process, in accordance with various embodiments.

FIG. 7B is a flow chart of a secure decoding process 750, in accordance with various embodiments. The process 750 may be performed at a receiver device, as introduced above. It is noted that the process 750 is merely an example, and is not intended to limit the present disclosure. Accordingly, it is understood that additional operations (e.g., blocks) may be provided before, during, and after the process 750 of FIG. 7B, certain operations may be omitted, certain operations may be performed concurrently with other operations, and that some other operations may only be briefly described herein. Various operations may be reflective of similar operations already discussed above in connection with FIG. 6B. Accordingly, certain aspects of these operations may be repeated below for completeness. Also, certain embodiments referenced in FIG. 7B may reference aspects of the secure transmission process 700 in continuation of FIG. 7A, above.

Returning to FIG. 7B, at block 752, the receiver device may receive the encoded payload referenced above in blocks 716 and 718 of FIG. 7A, above. As noted above, this encoded payload may be generated based on the session key generated in block 704, the biometric code generated in block 714, and the confidential information accessed in block 715. Furthermore, the session key may have an accompanying user identifier. Also, the encoded payload may be transmitted over a magnetic interface such that signals (e.g., the signals carrying the encoded payload) may be transmitted via magnetic flux.

In various embodiments, this encoded payload may be encoded into parts such that the various parts of the encoded payload may be communicated and received using different magnetic flux components of an xMR array of the receiver device, as discussed above. In certain embodiments, the number of different parts may be reflective of a number of different parts of the confidential information of block 715, such as 16 parts to represent 16 digits of a credit card number.

Returning to FIG. 7B, at block 754, the receiver device may receive the session key over the network, as referenced in blocks 704 and 720 of FIG. 7A, above. As noted above, the session key may be generated in response to initiating the authentication session and be accompanied by a user identifier. The session key may be a string of random numbers generated to reflect the independence of the single session as a standalone session. This string of random numbers may be used to differentiate different authentication sessions as each authentication session may be associated with a different session key. Also, the session key may be transmitted over the network, while the encoded payload may be separately transmitted over the magnetic interface.

Returning to FIG. 7B, at block 758, a known biometric code may be accessed. This biometric code may be the same or similar to the biometric code discussed above in the generation of the encoded payload. For example, the known biometric code may be generated from a known biometric reading of an authorized user of the user device. This known biometric code may be previously generated from previously collected biometric reading data of the authorized user. In various embodiments, the known biometric code may be stored in a datastore accessible to the receiver device such that the receiver device may retrieve (e.g., fetch) the known biometric code from the datastore in the performance of block 758. This known biometric code may be retrieved (e.g., fetched) using the user identifier accompanying the session key. In certain embodiments, the datastore may be located locally with the receiver device or may be remote to the receiver device such that the datastore that stores the known biometric code may be accessible to the receiver device via a network, such as the Internet. In particular embodiments, the known biometric code at block 758 may be generated from the same biometric reading data as that of block 708 (see FIG. 7A), such as where the known biometric reading data of block 708 and the biometric reading data utilized to generate the biometric code of block 758 (returning to FIG. 7B) are the same. For example, that same biometric reading data may be stored in a datastore accessible to both the user device and the receiver.

At block 770, the received encoded payload may be decoded. The encoded payload may be decoded based on a session key and a biometric code to reveal to confidential information encoded in the received encoded payload. Accordingly, the receiver device may decode the encoded payload to access the confidential information based on the received session key of block 54 and the accessed biometric code of block 758. In certain embodiments, this decoding may be an inverse operation that decodes based on the predetermined (e.g., known) encoding performed to generate the encoded payload.

At block 772, a decision may be made as to whether the decoding was successful. For example, the decoding may be successful if the decoded confidential information matches an expected data structure or formatting for the decoded confidential information. In certain embodiments, the decoded confidential information may be referred to more generically as a decoded user payload. If the decoding yields a result that is unexpected, or is not of an expected data structure or formatting (e.g., gibberish or an undecipherable result), then the decoding may be deemed to be unsuccessful. In further embodiments, the decoding may be successful if the decoded confidential information may be utilized to perform or complete the transaction. For example, the decoding may be successful if the decoded confidential information is capable of being used to complete the transaction (e.g., a valid credit card number) while the decoding may be successful if the decoded confidential information is not capable of being used to complete the transaction (e.g., an invalid credit card number). If the decoding was unsuccessful, the process 700 may proceed to block 774. However, if the decoding was successful, then the process 700 may proceed to block 776.

At block 774, the authentication session may end. By ending the authentication session without completing a transaction, the transaction that was initiated at the receiver device (see FIG. 7A, block 702) may not be completed. Ending the authentication session in this manner may be indicative of some degree of tampering or other undesirable interference or condition, as representative of the encoded payload not being of an expected session (e.g., as indicated by a particular session key) and/or of an unauthorized user of the user device (as indicated by the biometric code and/or associated biometric reading data). In certain embodiments, the session key received in block 754 and/or the encoded payload received in block 752 may be discarded as part of ending the authentication session.

At block 776, the receiver device may complete the transaction that was initiated at the receiver device (see FIG. 7A, block 702). As noted above, this transaction may be of a confidential or sensitive nature, such that safety measures may be taken to ensure that the confidential information associated with the transaction (e.g., the confidential information of block 715, discussed above) is handled in a sensitive manner. For example, this transaction may be a financial transaction where an instruction or request for monetary transfer is being performed using the confidential information decoded in block 770. Also, by undergoing the process 750, the transaction may be completed under the assurance that the transaction is associated with an expected session and an authorized user of the user device.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a user device, comprising:
generating a session key in response to initiating a transaction;
collecting biometric reading data associated with the transaction;
converting the biometric reading data into a biometric code;
generating a user payload based on the biometric code and the session key;
transmitting the user payload via a magnetic transmitter, wherein the magnetic transmitter comprises a magnetic sensor array having a plurality of magnetic flux components configured to generate a variable magnetic flux;
transmitting the session key via a network connection separate from the magnetic transmitter;
comparing the biometric reading data with stored biometric reading data; and
converting the biometric reading data into the biometric code in response to the biometric reading data not deviating beyond a failure threshold from the stored biometric reading data,
wherein the failure threshold is a percentage of differences between adjacent normal RR intervals that are greater than 50 milliseconds.

2. The method of claim 1, further comprising:
ending the transaction in response to the biometric reading data deviating beyond the failure threshold from the stored biometric reading data.

3. The method of claim 1, further comprising:
generating the user payload based on the biometric code, the session key, and confidential information.

4. The method of claim 3, wherein the confidential information is credit card information, wherein the magnetic transmitter comprises sixteen flux components, and wherein the user payload comprises sixteen separate parts with each part transmitted using a different flux component.

5. The method of claim 1, wherein the biometric reading data is produced from at least one of: a heartrate scanner, a fingerprint scanner, an iris scanner, and a facial recognition scanner.

6. The method of claim 5, wherein the heartrate scanner is at least one of a pulse oximeter or a sensor for an electrocardiogram or a magnetocardiography reading.

7. The method of claim 6, wherein the biometric reading data comprises either an RR interval or a PP interval.

8. The method of claim 1, wherein the biometric reading data is collected using an ancillary device interfaced with the user device.

9. The method of claim 1, wherein the plurality of flux components are configured to be calibrated based on a type of information to be transmitted by the magnetic transmitter.

10. The method of claim 1, wherein each of the plurality of flux components are configured to be controlled by controlling at least one of a corresponding row and column of the magnetic sensor array.

11. A method, comprising:
generating, at a transmitter, a session key in response to initiating a transaction;
collecting biometric reading data associated with a user;
converting the biometric reading data into a biometric code;
generating a user payload based on the biometric code and the session key;
sending, from a magnetic transmitter to a receiver, the user payload via the magnetic transmitter, wherein the magnetic transmitter comprises a magnetic sensor array having a plurality of magnetic flux components configured to generate a variable magnetic flux; and
sending, from the transmitter to the receiver, the session key via a network connection separate from the magnetic transmitter;
accessing, at the receiver, a stored biometric code produced from stored biometric reading data associated with the user;
producing a result from processing the user payload based on the stored biometric code and the session key; Comparing the biometric reading data with stored biometric reading data; and converting the biometric reading data into the biometric code in response to the biometric reading data not deviating beyond a failure threshold from the stored biometric reading data, wherein the failure threshold is a percentage of differences between adjacent normal RR intervals that are greater than 50 milliseconds and
completing the transaction based on the result meeting a criteria,
wherein the biometric reading data is collected using a laser emitting diode, and
wherein the laser emitting diode is coupled with a processor of the transmitter via a filter circuit.

12. The method of claim 11, wherein the magnetic transmitter is a magnetoresistance array.

13. The method of claim 11, wherein the laser emitting diode is coupled with an inductor at a first node, and wherein the processor is coupled with the inductor and a capacitor at a second node.

14. The method of claim 11, wherein the magnetic transmitter is disposed within the transmitter, wherein the magnetic transmitter concentrates magnetic flux induced by the magnetic transmitter at an interface along the transmitter.

15. The method of claim 11, wherein the plurality of flux components are configured to be calibrated based on a type of information to be transmitted by the magnetic transmitter.

16. The method of claim 11, wherein each of the plurality of flux components are configured to be controlled by controlling at least one of a corresponding row and column of the magnetic sensor array.

17. A method performed by a user device, comprising:
generating a session key in response to initiating a transaction;
collecting biometric reading data associated with the transaction;
converting the biometric reading data into a biometric code;
generating a user payload based on the biometric code and the session key;
transmitting the user payload via a magnetic transmitter;
transmitting the session key via a network connection separate from the magnetic transmitter;
comparing the biometric reading data with stored biometric reading data; and
converting the biometric reading data into the biometric code in response to the biometric reading data not deviating beyond a failure threshold from the stored biometric reading data, wherein the failure threshold is a percentage of differences between adjacent normal RR intervals that are greater than 50 milliseconds.

18. A method performed by a user device, comprising:
generating a session key in response to initiating a transaction;
collecting biometric reading data associated with the transaction;
converting the biometric reading data into a biometric code;
generating a user payload based on the biometric code and the session key;
transmitting the user payload via a magnetic transmitter;
transmitting the session key via a network connection separate from the magnetic transmitter; and
further generating the user payload based on the biometric code, the session key, and confidential information, wherein the confidential information is credit card information, wherein the magnetic transmitter comprises sixteen flux components, and wherein the user payload comprises sixteen separate parts with each part transmitted using a different flux component.

* * * * *